(12) United States Patent
Pederson et al.

(10) Patent No.: US 7,762,058 B2
(45) Date of Patent: Jul. 27, 2010

(54) ULTRA-COMPACT, HIGH PERFORMANCE AEROVORTICAL ROCKET THRUSTER

(75) Inventors: Robert J. Pederson, Thousand Oaks, CA (US); Stephen N. Schmotolocha, Thousand Oaks, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 400 days.

(21) Appl. No.: 11/787,585

(22) Filed: Apr. 17, 2007

(65) Prior Publication Data

US 2008/0256924 A1  Oct. 23, 2008

(51) Int. Cl.
*F02K 9/00* (2006.01)
(52) U.S. Cl. .......................... 60/258; 60/251
(58) Field of Classification Search ............ 60/251, 60/257, 258, 737, 738, 748
See application file for complete search history.

(56) References Cited

U.S. PATENT DOCUMENTS

| | | | |
|---|---|---|---|
| 2,605,608 A | 8/1952 | Barclay, Jr. | |
| 2,605,611 A | 8/1952 | Wosika | |
| 2,720,754 A | 10/1955 | Francois | |
| 2,773,350 A | 12/1956 | Barrett et al. | |
| 2,828,603 A | 4/1958 | Laucher | |
| 2,828,609 A | 4/1958 | Ogilvie | |
| 2,833,115 A | 5/1958 | Clarke et al. | |
| 3,092,964 A | 6/1963 | Martin et al. | |
| 3,103,102 A | 9/1963 | Sargent et al. | |
| 3,161,379 A | 12/1964 | Lane | |
| 3,321,920 A * | 5/1967 | Walter et al. | 60/211 |
| 3,324,660 A | 6/1967 | Lane et al. | |
| 3,576,384 A | 4/1971 | Peczeli et al. | |
| 3,701,255 A | 10/1972 | Markowski | |
| 3,901,028 A | 8/1975 | Leingang | |
| 3,925,002 A | 12/1975 | Verdouw | |
| 3,977,353 A | 8/1976 | Toyama | |
| 4,073,138 A | 2/1978 | Beichel | |
| 4,185,457 A | 1/1980 | Parker et al. | |
| 4,220,001 A | 9/1980 | Beichel | |
| 4,263,780 A | 4/1981 | Stettler | |

(Continued)

FOREIGN PATENT DOCUMENTS

DE  10130355 A1 *  1/2003  .................. 60/251

(Continued)

*Primary Examiner*—Michael Cuff
*Assistant Examiner*—Phutthiwat Wongwian
(74) *Attorney, Agent, or Firm*—Carlson, Gaskey & Olds PC

(57) ABSTRACT

An ultra-compact aerovortical swirl-enhanced combustion (ASC) system features an aerovortical swirl generator for use in rocket thrusters utilizing hypergolic or non-hypergolic propellants. The ACS thruster can be sized for diameters ranging from about 0.5 to about 2.0 inches, and producing thrust levels of approximately 5 $lb_f$ to about 250 $lb_f$. A plurality of helicoid flow channels in the swirl generator introduces swirl into a flow stream of a first propellant within ultra-compact sized rocket thrusters. The ASC system also includes injectors for introducing a second liquid propellant into the swirling flowfield to promote rapid and efficient atomization, mixing and vigorous combustion, which, results in major improvements in combustion and propulsion performance over current rocket thrusters, but in much shorter combustor systems. Hence, the ultra-compact ASC system is a substantial improvement in small bipropellant chemical propulsion thrusters, which can be utilized in-space satellite, spacecraft maneuvering and attitude/orbit control.

14 Claims, 5 Drawing Sheets

U.S. PATENT DOCUMENTS

| | | | |
|---|---|---|---|
| 4,343,147 A | 8/1982 | Shekleton | |
| 4,461,146 A | 7/1984 | DuBell | |
| 4,470,262 A | 9/1984 | Shekleton | |
| H19 H | 2/1986 | Carlson | |
| 4,598,553 A | 7/1986 | Saito et al. | |
| 4,648,571 A | 3/1987 | Gerhardt | |
| 4,686,826 A | 8/1987 | Koshoffer et al. | |
| 4,840,025 A * | 6/1989 | Coffinberry | 60/219 |
| 4,896,502 A | 1/1990 | Ravel et al. | |
| 4,919,364 A | 4/1990 | John et al. | |
| 5,101,633 A | 4/1992 | Keller et al. | |
| 5,154,051 A * | 10/1992 | Mouritzen | 60/257 |
| 5,240,404 A | 8/1993 | Hemsath et al. | |
| 5,251,447 A | 10/1993 | Joshi et al. | |
| 5,311,735 A | 5/1994 | Orlando | |
| 5,319,923 A | 6/1994 | Leonard et al. | |
| 5,319,935 A | 6/1994 | Toon et al. | |
| 5,411,394 A | 5/1995 | Beer et al. | |
| 5,511,970 A | 4/1996 | Irwin et al. | |
| 5,675,971 A | 10/1997 | Angel et al. | |
| 5,685,142 A | 11/1997 | Brewer et al. | |
| 5,779,169 A | 7/1998 | Sloan | |
| 5,845,480 A | 12/1998 | DeFreitas et al. | |
| 6,301,900 B1 | 10/2001 | Mandai et al. | |
| 6,374,615 B1 | 4/2002 | Zupanc et al. | |
| 6,748,735 B2 | 6/2004 | Schmotolocha et al. | |
| 6,820,411 B2 | 11/2004 | Pederson et al. | |
| 6,895,756 B2 | 5/2005 | Schmotolocha et al. | |
| 6,907,724 B2 | 6/2005 | Edelman et al. | |
| 6,912,857 B2 | 7/2005 | Schmotolocha et al. | |
| 6,968,695 B2 | 11/2005 | Schmotolocha et al. | |
| 7,137,255 B2 | 11/2006 | Schmotolocha et al. | |
| 7,168,236 B2 | 1/2007 | Schmotolocha et al. | |

FOREIGN PATENT DOCUMENTS

| | | |
|---|---|---|
| GB | 754141 | 8/1956 |
| GB | 774059 | 5/1957 |

* cited by examiner (SECTION A-A)

(SECTION A-A)

(SECTION B-B)

(SECTION C-C)

(SECTION D-D)

US 7,762,058 B2

ULTRA-COMPACT, HIGH PERFORMANCE AEROVORTICAL ROCKET THRUSTER

BACKGROUND OF THE INVENTION

This invention relates generally to low thrust rocket propulsion thrusters and more particularly to bipropellant chemical thrusters for in-space satellite attitude and orbit control and in-space vehicle propulsion.

In-space propulsion thrusters are used to maneuver spacecraft (e.g. a satellite or space vehicle) after a launch vehicle has delivered it to the upper atmosphere. In general, the primary objective of a space propulsion thruster is to place the spacecraft into its intended orbit or maintain the spacecraft's proper position while in orbit. Specifically, onboard thrusters are used for orbit transfer; attitude pointing and control so that a spacecraft is correctly pointing towards the Earth, Sun or an astronomical object of interest; orbit altitude control; and station keeping. Thrust attitude control allows spacecraft to control the angular position while in orbit, which may be required for various sensors, transponders or other spacecraft hardware. Thruster systems must be able to operate in various propulsion modes, including short engine pulses to long duration steady-state firings depending on the mission requirements.

While in space, the purpose of the propulsion thruster is to change the velocity of the spacecraft. Because this is more difficult for larger spacecraft, propulsion thruster designs normally work with momentum (mv). The rate of change in momentum is referred to as a force ($F=d/dt(mv)$). Furthermore, acceleration is the rate of change in velocity ($a=d/dt(v)$). The goal of in-space thrusters is to create a force over a period of time, which is called an impulse ($F\Delta t=mv$). A spacecraft can be propelled to a specific velocity by applying a small acceleration over a long period of time ($\Delta t$), or alternatively, a large acceleration over a short period of time ($v=a\Delta t$). Similarly, a given impulse can be achieved with a large force over a short period of time or conversely with a small force over a longer time. This means that for maneuvering in space, a propulsion system that produces a very small acceleration but over a longer time can generate the same impulse as a propulsion system that produces a large acceleration, but over a short period of time ($F\Delta t=ma\Delta t$).

When evaluating the efficiency of a propulsion system, designers normally refer to the force or velocity produced relative to the amount of mass that has to be carried along with the rocket or thruster that is irretrievably consumed when used to generate thrust (i.e., finite amount of propellant available for a given mission). The performance of a rocket engine is typically characterized by the specific impulse, $I_{sp}$, which is the ratio of the engine thrust, F, to the mass flow rate ejected, $\dot{m}$. Thus, $I_{sp}=F/(\dot{m})=v_e/g_c$, with $v_e$ defined as the exhaust velocity, and $g_c$ the earth's gravitational acceleration, with units of seconds. When the thrust and the mass flow rate remain constant throughout the burning of the propellant, the specific impulse is the time during which the rocket engine provides a thrust equal to the amount of propellant consumed. Thus, to maximize thrust for a given amount of propellant consumption that is carried onboard the spacecraft requires a high specific impulse. For a given rocket engine, the specific impulse has a different value on the ground versus in the vacuum of space, due to the absence of atmospheric pressure. Hence, it is important to differentiate between specific impulse at sea level or in a vacuum.

Chemical propulsion thruster systems for spacecraft usually employ liquid reactants as the energy source. The propellant can be a single reactant (monopropellant) or a combination of liquid fuel and oxidizer (bipropellant). For a monopropellant system the most common propellant is hydrazine. Generally, for small thruster designs hydrazine is passed through a catalyst bed. As a result, thrust is produced by the decomposition of the propellant and catalyst into ammonia, nitrogen and hydrogen at a temperature of about 1300° F. Ignition of monopropellants can be produced thermally or by a catalytic material. Monopropellant propulsion systems are usually employed for attitude control and station-keeping since they are well suited to produce short duration pulses of thrust from less than a pound up to about 5 $lb_f$ with an accompanying $I_{sp}$ of about 230 seconds. Short duration pulses can range from about 0.01 or 0.02 seconds to about 0.10 seconds, and as a result the specific impulse can lose anywhere from about 50% to about 75% or 85% of the theoretical impulse value, respectively. Thus, monopropellant thrust systems typically have low $I_{sp}$ values. Since hydrazine is a highly toxic fuel (due to its vapors) and capable of exploding at 450° F., special safety features are required during use. When properly sealed, however, hydrazine stores well making it a widely used propellant.

For most bipropellant systems, nitrogen tetroxide is typically utilized as the oxidizer and either hydrazine or monomethyl hydrazine (MMH) is employed as the fuel. The reactants are hypergolic, meaning the fuel burns spontaneously upon contact with the oxidizer, hence facilitating ignition under vacuum conditions and in the pulsed mode of operation. Additionally, non-hypergolic bipropellants require some form of an ignition system to initiate combustion. Use of hypergolic propellants eliminates the need for an ignition system when multiple re-starts are required. The specific impulse of such a chemical propulsion thruster system would typically range from approximately 290 to 310 seconds with a thrust range typically between 90 $lb_f$ to about 140 $lb_f$. Such characteristics make hypergolic propellants well-suited for final orbit apogee insertion after initial drop-off by the launch vehicle. A smaller version of this thruster design could also be used for attitude control. Again, hydrazine or MMH vapors are extremely toxic, requiring special handling and the use of two propellants somewhat complicates the propellant management for on-board spacecraft.

For a typical spacecraft operating in Earth orbit, the weight of the propulsion thrust system, including onboard propellants, can range from 10% to 20% of the total spacecraft weight, and up to 40% to 50% if the spacecraft is required to significantly alter its orbit. As a result, technology improvements have focused on achieving higher specific impulse $I_{sp}$, since about 90% of the thrust propulsion system consists of propellants. Most recent improvements in rocket thruster technology have concentrated on increasing the allowable operating temperature of the combustion chamber to achieve small reproducible impulse without affecting the overall specific impulse. However, the general goal of chemical thruster technology is to develop high specific impulse rocket systems. For small thruster systems that may use hypergolic, advanced, or traditional rocket propellants, high specific impulse rocket systems are achieved by increasing combustion and propulsive efficiencies and increasing performance across a broad spectrum of thrust levels (less than about 5 $lb_f$ to about 250 $lb_f$ and upwards to about 500 $lb_f$). Improvements in high-temperature materials for combustor/nozzle components also increase the specific impulse of a rocket thrust system. Thus, it is typically always desirable to increase the specific impulse (currently to above 350 seconds), minimize rocket weight and mass, operate radiation cooled rockets at arbitrary propellant mixture ratios with all onboard propellant options and reduce overall costs. To put the specific impulse goal in perspective, the SSME (Space Shuttle Main Engine) rocket engine using liquid hydrogen/liquid oxygen, has a very high vacuum specific impulse of 452 seconds and a vacuum thrust level of 491,000 $lb_f$. This very high efficiency is achieved by utilizing a staged combustion cycle, whereby a portion of the propellants that are partially combusted, at a fuel-rich mixture ratio, is used to drive the high pressure turbo-pump prior to undergoing combustion in the main combustion chamber. This type of rocket engine is much too complicated and cannot be miniaturized for implementing into small spacecraft thruster systems.

Recently, aerovortical swirl-dump combustion (ASC) technology has been developed and introduced into airbreathing, ramjet, combined-cycle, and rocket propulsion applications to improve engine performance. The key feature of the swirl-dump combustion technology is the swirl generator. The swirl generator with a dump-combustor design is able to obtain near complete combustion of the liquid propellants over a wide range of mixture ratios and within very short combustor lengths and diameters. High propulsion performance has been test demonstrated in a combustor-convergent nozzle length to diameter ratio (L/d) of 1.6; while analysis shows that this L/d can be further reduced down to 1.0 or less with equally high engine performance. Furthermore, the swirl generator has no moving parts so the complexity of the engine and production cost is kept low. The swirl generator introduces a swirling flowfield through the use of a stationary vane design into which the liquid fuel and/or oxidizer propellants are introduced. Each swirl vane imparts tangential and radial velocities into the combustion constituents, thereby producing a highly turbulent three-dimensional flowfield in the combustor. The high turbulence scale and intensity in this swirling aeroflow structure rapidly and efficiently improves atomization, vaporization, mixing and burning of the injected fuel and oxidizer propellants. In addition, the swirl generator design improves flame propagation and spreading, operability range and combustion stability. All of these features result in a very high combustion efficiency and high performance in short combustor lengths over wide flammability limits. Thus, the size and weight of an ultra-compact rocket engine thruster can be significantly reduced, while maintaining high propulsion performance if it could be combined with swirl combustion technology.

However, current swirl vane designs are limited in their applicability to ultra-compact rocket engine designs due to their low-end size limitation. For ultra-compact rocket engine designs that are, for example, less than about two inches in diameter, it is very difficult to fabricate, integrate and assemble individual swirl vanes into the vane pack. This hampers practical application of swirl combustion technology into the ultra-compact rocket engine designs. Thus, there is a need for smaller, lighter and better performing ultra-compact rocket engine designs suitable for spacecraft applications. Specifically, there is a need for swirl combustion technology suitable for use in ultra-compact rocket engine designs.

BRIEF SUMMARY OF THE INVENTION

The present invention is directed toward an ultra-compact aerovortical swirl combustion (ASC) system for use with rocket thrusters employed in various spacecraft, such as satellites and spacecraft for maneuvering, as well as, attitude/orbit control. The ASC rocket thruster system can be used with both hypergolic and non-hypergolic propellants. Furthermore, the ASC thruster can be sized for diameters ranging from about 0.5 inches to about 2.0 inches, producing thrust levels ranging from less than 5 $lb_f$ to about 250 $lb_f$. One key feature of the ASC system is a swirl generator that results in improvements in propulsion performance over historical thruster designs. The swirl generator includes a plurality of helicoid flow channels for producing a turbulent, swirling flowfield into a stream of a first propellant to improve mixing and combustion processes with a second propellant. The helicoid flow channels allow the swirl generator to be fabricated for use in ultra-compact sized rocket thrusters. In one embodiment, the aerovortical swirl generator includes a swirler, a bluffbody, a fuel manifold and an oxidizer manifold for use with hypergolic propellants. In such an embodiment, the ASC system may also include an acoustical cavity and/or a fuel boundary layer control between the combustion process and the combustor wall to prevent oxidizer from reacting with the wall. In another embodiment, the aerovortical swirl generator includes a swirler, a centerbody, a bluffbody, an ignition source, a dump-step and ramp, and a plurality of injectors for use with non-hypergolic propellants. In all embodiments, the aerovortical swirl generator broadens the scope of potential rocket engine thruster applications by reducing the combustor length and weight of the thruster propulsion system, while improving propulsion performance.

DETAILED DESCRIPTION

Figure 1:
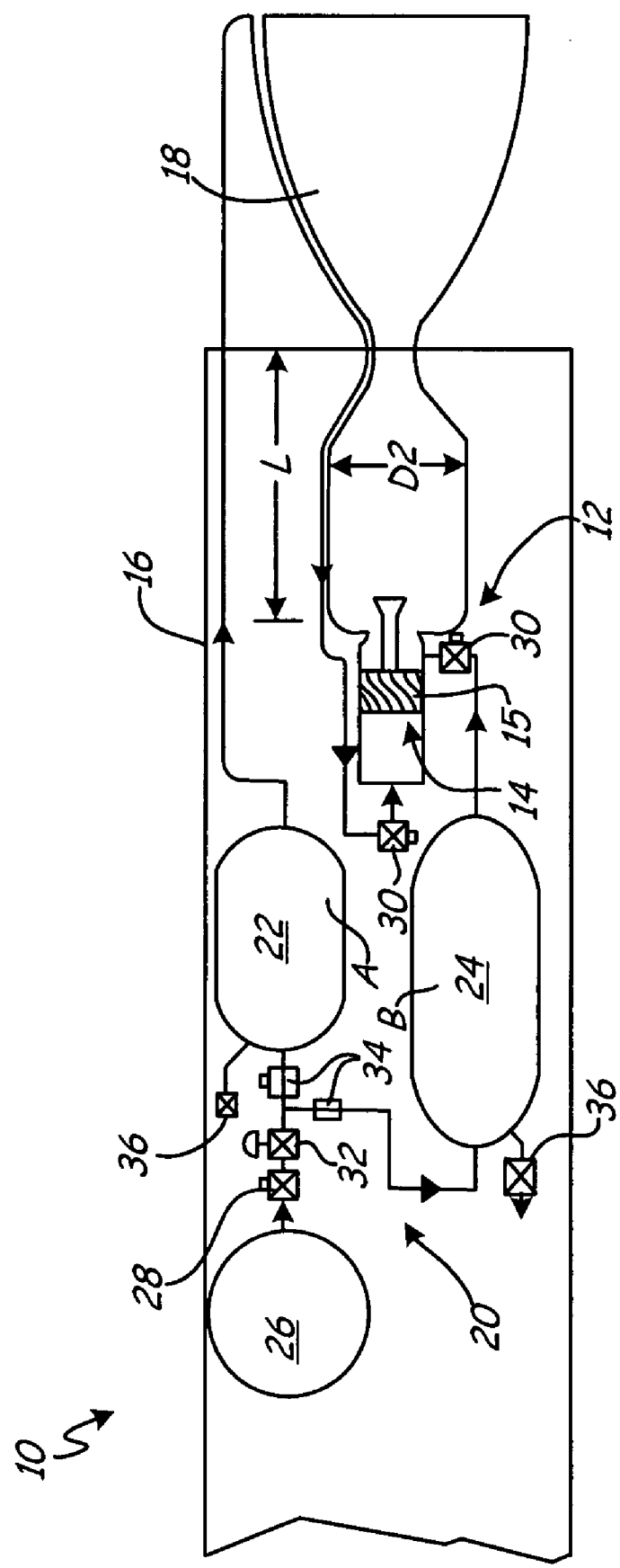
FIG. 1 shows an ultra-compact, high performance aerovortical swirl-enhanced combustion rocket propulsion thruster system featuring an aerovortical swirl-dump combustor design of the present invention.

FIG. 1 shows a schematic of liquid bipropellant thruster 10 having aerovortical swirl-dump combustor 12 with ultra-compact, aerovortical swirl generator 14 having helicoid flow channels 15. Thruster 10 also includes thruster body 16, thrust nozzle 18 and gas pressure feed system 20, which can be configured for a variety of ultra-compact rocket engine applications; such as in-space satellite attitude and orbit control, in-space vehicle propulsion, or propulsion of some similar spacecraft. Thruster body 16 provides a housing for propellant constituent storage tanks 22 and 24, high pressure supply tank 26, high pressure gas valve (remote control) 28, propellant valves (remote control) 30, pressure regulator 32, check valves 34, and storage tank vent valves 36.

Rocket thruster 10 must carry an adequate supply of combustion constituents, typically an oxidizer and a fuel, for use in the combustion process necessary to generate thrust for propelling the spacecraft. Liquid fuel propellant storage tank 22, which includes combustion constituent A, and oxidizer storage tank 24, which includes combustion constituent B, are connected to aerovortical swirl-dump combustor 12, swirl generator 14 and nozzle 18, through gas pressure feed system 20, which includes pressure supply tank 26. Pressure supply tank 26 provides high pressure gas to storage tanks 22 and 24 such that combustion constituents A and B can be supplied to combustor 12 to carry out a combustion process. Nozzle 18 is located at the downstream end of aerovortical swirl combustor 12 for receiving byproducts of the combustion process and producing thrust.

The high pressure gas of tank 26 is fed into propellant tanks 22 and 24 at a controlled pressure, hence providing control of the propellant discharge. In spacecraft where low thrust levels and/or short thrust duration is required, a propellant feed system using high pressure gas is the preferred approach due to its simplicity and reliability. Gas feed system 20 includes high pressure gas supply tank 26, high pressure gas valve, 28 and high pressure gas regulator 32, which are required to pump liquid propellant combustion constituents A and B from storage tanks 22 and 24 to swirl generator 14, whereby a variety of fuel injectors, such as positioned on combustor 12 or within swirl generator 14, distribute constituents A and B for use in the combustion processes that is swirl-enhanced by swirl generator 14. Swirl generator 14 imparts tangential and radial velocity components which cause the flowsteam of first combustion constituent A to swirl around as it passes through to combustor 12. The introduced swirling motion into combustion constituent A creates highly turbulent three-dimensional aerodynamic flow structure with an embedded large scale central recirculation zone (CRZ). Into this swirling flow system of constituent A, a second combustion constituent B is injected, mixed and burned. As combustion progresses downstream inside the swirl-dump combustor 12, the radial and tangential components of the burning swirl flow, rapidly decay throughout combustor 12 and nozzle 18 due to the design of swirl generator 14. The products of combustion are then expanded through divergent nozzle 18 with the flow being approximately axial, to provide thrust to the rocket thruster 10. The design of swirl generator 14 and the attendant flowpath minimize swirl losses and delivers approximately 99% of the generated thrust to the spacecraft. Nozzle 18 can be selected from a group of convergent-divergent nozzles as is known in the art, depending on the design requirements of rocket thruster 10.

There are many purposeful applications of small rocket thruster engines. For example, rocket thrusters are in high demand for orbit transfer, attitude pointing and control, orbit altitude control, station keeping, small space vehicle propulsion, satellite reaction control systems, and missile defense programs. The challenge has been to continually improve thruster propulsion performance and minimize weight and volume for rocket thrusters in order to maximize the propellant storage capabilities and the specific impulse $I_{sp}$. The present invention overcomes many of the size, weight, fabrication and propulsion performance issues currently encountered in small rocket engines by incorporating aerovortical swirl-dump combustor 12 having swirl generator 14, thus allowing thruster 10 to be used in ultra-compact rocket thrusters.

Ultra-compact aerovortical swirl-dump combustion rocket thruster 10 is designed to generate thrust levels that can range from less than about 5 $lb_f$ to about 250 $lb_f$ for various small propulsion applications cited above. Swirl generator 14 can be made having diameters from about 0.5 inches (~1.27 cm) to about 2.0 inches (~5.08 cm), thus enabling ultra-compact rocket engine thruster sizes. Swirl generator 14 includes helicoid flow channels 15 that permit economical, small-sized fabrication of swirl generator 14. Swirl generator 14 results in very short combustor lengths required to complete the combustion process, with associated high combustion efficiency and $I_{sp}$ performance, due to the swirling flow stream enhancing mixing of the combustion constituents generated by helicoid flow channels 15 and swirl-dump combustor 12. The overall size and weight of ultra-compact rocket engine thruster 10 is significantly reduced because the aerovortical swirl combustor 12 can attain significantly reduced combustor convergent nozzle-to-length-to-diameter (L/D2) ratios of about 1.0 to about 1.6. Furthermore, the reduced size, weight, and L/D2 ratio reduce the cost associated with ultra compact rocket engine thrusters. The improvements of the present invention provide a high performance propulsion system for use in ultra-compact rocket engine thrusters.

Figure 2:
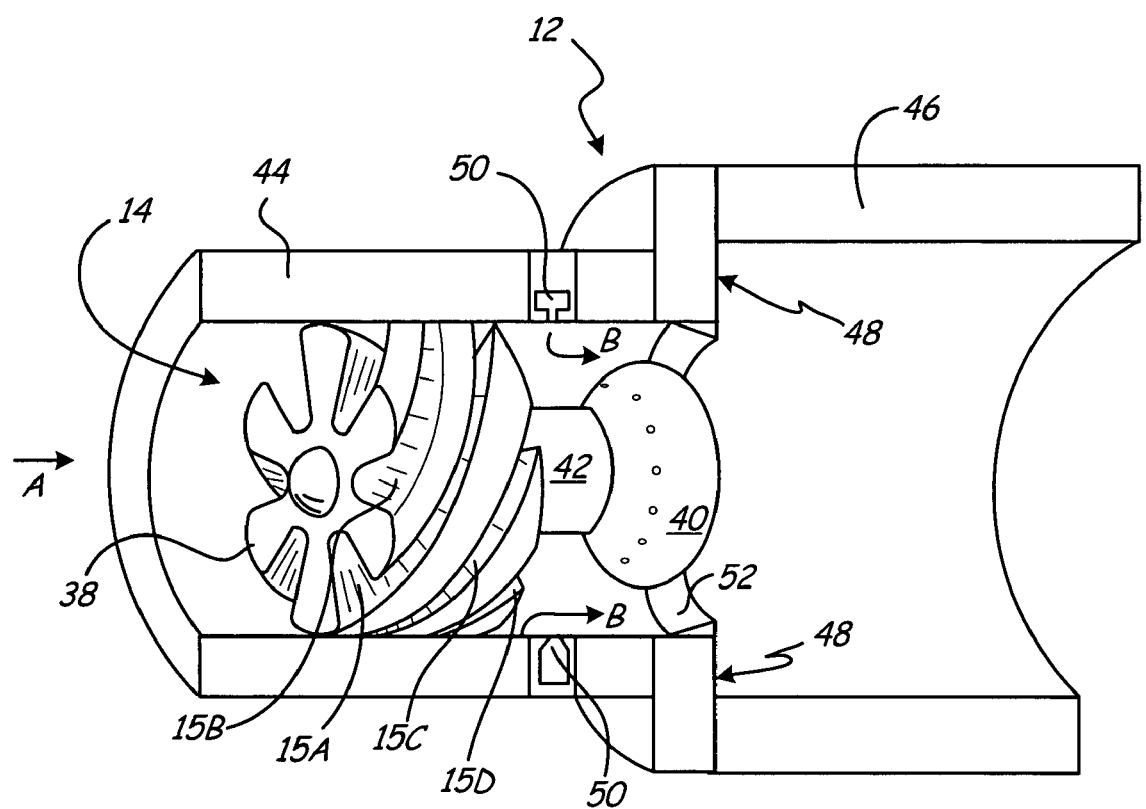
FIG. 2 shows the aerovortical swirl-dump combustor for use with non-hypergolic propellants of FIG. 1 having an ultra-compact, aerovortical swirl generator with helicoid flow channels.

FIG. 2 shows a perspective view of aerovortical swirl generator 14 of the present invention implemented within aerovortical swirl-dump combustor 12, which is shown partially cut-away. Aerovortical swirl generator 14 comprises swirler 38, which includes a plurality of helicoid flow channels (with helicoids flow channels 15A, 15B, 15C, and 15D shown); bluffbody 40 and centerbody 42. Aerovortical swirl generator 14 also includes an ignition source that is embedded in the base of bluffbody 40 (see igniter 60 in FIG. 3). Aerovortical swirl-dump combustor 12 includes swirl inlet duct wall 44, combustor wall 46, dump-step 48, wall injectors 50 and ramp 52. In the embodiment shown, aerovortical swirl generator 14 is used with non-hypergolic propellants. The design of swirl generator 14 improves mixing of non-hypergolic propellants and considerably accelerates their combustion process for generating thrust. Swirl generator 14 is positioned in the inlet of combustor 12, surrounded by swirl inlet duct wall 44. A flow stream of a first combustion constituent A enters and encounters the most upstream portion of the swirl generator 14, which includes helicoid flow channels 15A, 15B, 15C, and 15D. Helicoid flow channels 15A-15D are cut into the leading edge face of swirl generator 14 and extend through to the trailing edge face in a spiraling manner. Each flow channel has generally rounded troughs (radially inner extent) and tips (radially outer extent), although any suitable design may be used. Directly downstream of the helicoid flow channels 15A, 15B, 15C, and 15D is centerbody 42. The downstream end of centerbody 42 is directly integrated with bluffbody 40.

The flow stream of the first combustion constituent A enters swirler 38 from fuel propellant tank 22 (FIG. 1), and the plurality of helicoid flow channels 15A, 15B, 15C, and 15D impart radial and tangential velocities, causing a change in the flow direction and producing a highly turbulent three-dimensional flowfield having a large central recirculation zone (CRZ) downstream of bluffbody 40, and a toroidal outer recirculation zone (ORZ) downstream of dump-step 48. The flow stream continues downstream from swirler 38, over centerbody 42 and past bluffbody 40. Using, for example, wall injectors 50, combustion constituent B is injected from oxidizer propellant tank 24 (FIG. 1) into the turbulently swirling flow of constituent A downstream of swirler 38, whereupon the two constituents mix while entering combustor 12. Bluffbody 40 anchors a vortex of the CRZ and dump-step 48 anchors a vortex of the ORZ such that combustion is stabilized by bluffbody 40 and dump-step 48, respectively. Ramp 52 increases the height of dump-step 48 to improve mixing and combustion of constituents A and B. Swirler 38 and helicoid flow channels 15A, 15B, 15C, and 15D, enable aerovortical swirl generator 14 to produce robust mixing and, together with bluffbody 40 and dump-step 48, improve the combustion process, thereby facilitating use of a high-performance aerovortical swirl-dump combustor design in ultra-compact rocket thrusters. A spark igniter is located inside the aft portion of bluffbody to initialize combustion of the constituents A and B within combustor 12 (see FIG. 3). FIG. 1 depicts bluffbody 40 as having a solid-flared conical configuration, but the present invention is not limited to only solid-flared conical bluffbody designs. Other bluffbody embodiments include, for example, a hollow cone or a channeled bluffbody, as seen in FIG. 3, to accommodate other igniter and injector configurations.

Figure 3:
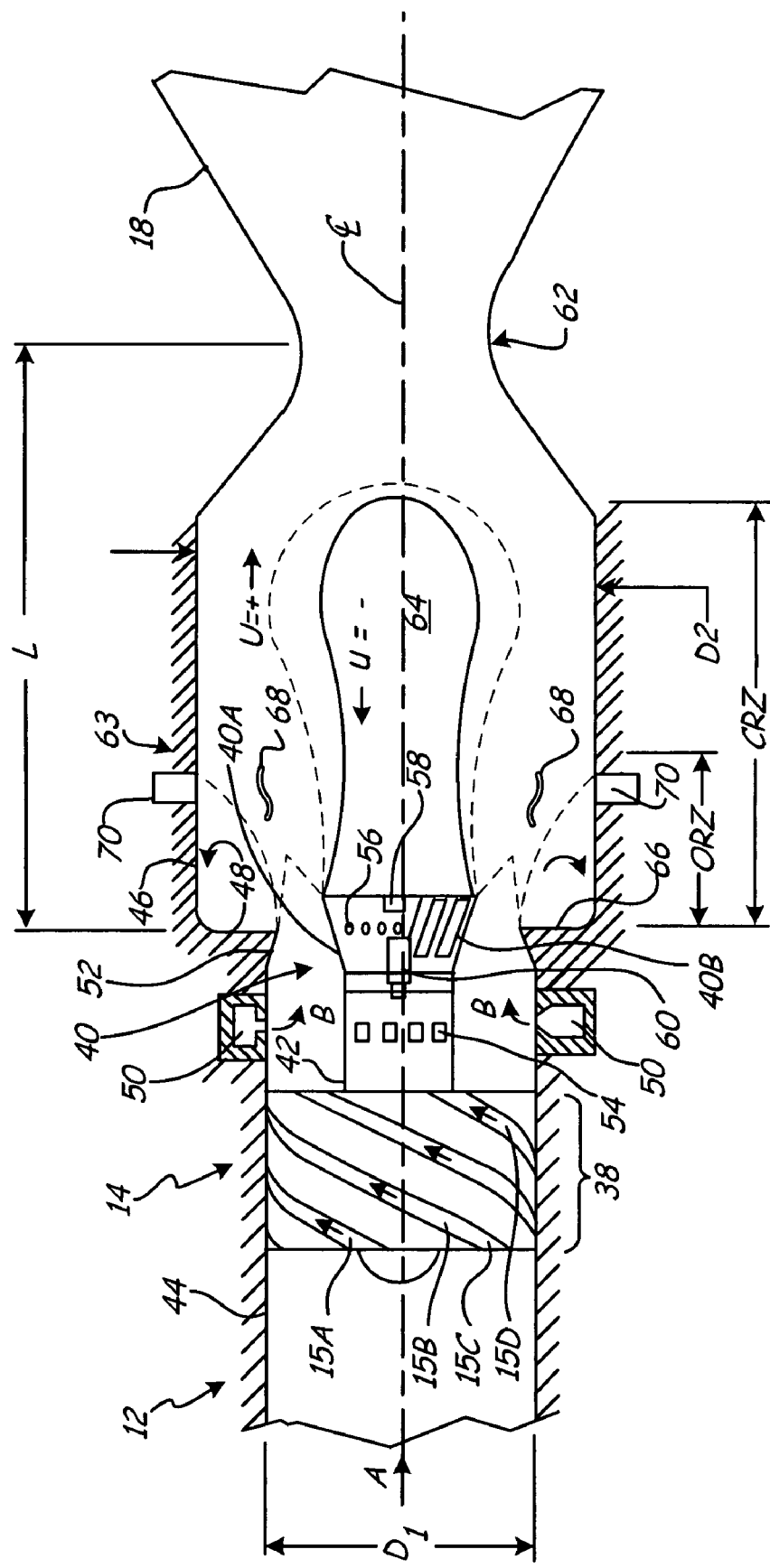
FIG. 3 shows a cross-section of a combustion process having aerodynamic flowfield structures generated by the aerovortical swirl generator within the aerovortical swirl-dump combustor of FIG. 2.

FIG. 3 shows a cross-section of aerovortical, swirl-dump combustor 12 and the resulting aerodynamic flowfield of the present invention. Swirl-dump combustor 12 includes swirl generator 14, swirl inlet duct wall 44, combustor wall 46, dump-step 48, wall injectors 50 and ramp 52. Swirl generator 14 includes swirler 38, bluffbody 40, centerbody 42, centerbody injectors 54, bluffbody injectors 56 and 58, and igniter 60. Swirler 38 includes helicoid flow channels 15A, 15B, 15C, and 15D. Bluffbody 40 is shown having solid-flared conical bluffbody 40A and channeled bluffbody 40B, which represent alternative, exclusive designs for bluffbody 40. Combustor wall 46 is connected with exhaust nozzle 18, which includes throat portion 62.

Swirl-dump combustor 12 works with swirl generator 14 to achieve robust mixing and high-performance combustion along length L of swirl-dump combustor 12. Swirler 38 with helicoid flow channels 15A, 15B, 15C, and 15D reduce the required combustor length for combustion to occur. For example, combustor L/D2 ratios of approximately 1.6 to approximately 1.0 with high propulsion performance are readily achievable. Centerbody injectors 54, wall injectors 50, bluffbody injectors 56 and 58, selectively introduce a second combustion constituent B into the swirling flow stream of first combustion constituent A. However, in other embodiments, any combination of centerbody injectors 54, wall injectors 50 or bluffbody injectors 56 and 58 can be used to introduce second combustion constituent B. While mixing, constituents A and B pass over ramp 52, dump-step 44, bluffbody 40 and enter combustion chamber 63 along wall 46, so that CRZ 64 and ORZ 66 stay established continuously in combustion chamber 63. Combustor wall 46 encapsulates combustion chamber 63 in which CRZ 64, ORZ 66 and shear layer 68 are located. CRZ 64 and ORZ 66 bound and compress high-turbulence intensity shear layer 68 to create vigorous and highly turbulent mixing of combustion constituents A and B during combustion. CRZ 64 and ORZ 66 anchor and stabilize flames produced during combustion. The main combustion, however, takes place within shear layer 68, which is highly turbulent. Aerovortical swirl-dump combustor 12 imposes a vortical flow that enhances mixing and promotes rapid, highly intense, and more efficient combustion, yet in a very short combustor length. The combination of these aerodynamic flowfield features, produced by aerovortical swirl generator 14, provides faster and more robust mixing at much higher turbulence intensity and scale levels, improves fuel atomization and vaporization, and promotes vigorous combustion, including increased flame propagation and flame spreading rates. As a consequence, length L of swirl-dump combustor 12 is significantly reduced, yet propulsion performance (combustion efficiency, pressure recovery and net thrust) remains very high. The main combustion is completed, for all practical purposes, before reaching nozzle throat 62. The products of combustion are accelerated through convergent/divergent nozzle 18 to produce thrust. Further in-depth description of swirl mixing and combustion processes used in the present invention is found in "COMPACT, LIGHTWEIGHT HIGH-PERFORMANCE LIFT THRUSTER INCORPORATING SWIRL-AUGMENTED OXIDIZER/FUEL INJECTION, MIXING AND COMBUSTION," U.S. Pat. No. 6,820,411 by Pederson et al., which is incorporated by this reference.

Typical combustion constituents are selected from a group of common liquid propellants used in aerospace applications, including combinations of: cryogenic liquid propellant such as LOX (liquid oxygen) and $LH_2$ (liquid hydrogen), LOX and $CH_4$ (methane), and LOX and RP-1 (kerosene, which is a hydrocarbon fuel)]. Injectors 50, 54, 56 and 58 may comprise orifice type, simplex type, duplex type, variable area injectors, fan spray atomizer injectors or other types as are known to those skilled in the art. However, depending on design specifications, other embodiments of aerovortical swirl-dump combustor 12 could utilize other types of propellant oxidizer/fuel combinations.

With any combustion constituent combination, injectors 50, 54, 56 and 58 are positioned such that second combustion constituent B will be optimally injected into the flow of first combustion constituent A such that constituent B will interact with the swirling flow of constituent A. All injectors of the present invention (bluffbody injectors 56 and 58, centerbody injectors 54, and wall injectors 50) are located downstream of the swirler 38 to reduce the potential for flashback and to mitigate damage to helicoid flow channels 15A, 15B, 15C, and 15D. Injectors can be positioned in various combinations and positions along the circumference of the swirl inlet duct wall 44 of combustor 12, such as wall injector 50, which in this example is flush to the swirl inlet duct wall 44 and aligned along the flow stream with centerbody 42. In other embodiments, wall injectors can extend into the flow stream within swirl inlet duct wall 44. Likewise, in other embodiments, injectors can also be placed within centerbody 42 and bluffbody 40 at various positions. For example, injectors 54 are placed around the circumference of centerbody 42, and injectors 56 are placed around the circumference of bluffbody 40 when igniter 60 within bluffbody 40 is used. In an alternative embodiment, injector 58 is placed on the downstream facing end of bluffbody 40 in place of igniter 60. Centerbody 40 adjusts the axial position of bluffbody 40 relative to dump-step 48 such that centerbody injectors 54 are advantageously positioned to pilot CRZ 64 and fine tune combustion performance during throttling. Thus, injectors 50, 54, 56 and 58 permit flexibility in fueling CRZ 64 and ORZ 66, depending on design preference.

For illustration, bluffbody 40 is shown having a solid-flared conical 40A, together with channeled bluffbody 40B. Solid conical bluffbody 40A is flared such that turbulence is produced in the downstream flow of combustion constituent A within combustor wall 46. In order to further produce turbulence and swirl within the flow of combustion constituent A, bluffbody 40 can include channels such as that of channeled bluffbody 40B, thus offering another option in design preference. Channeled bluffbody 40B is designed and sized to maintain the same flow stream blockage as solid flared bluffbody 40A. In one embodiment of the present invention, channeled bluffbody 40B includes a thirty-degree flare having ten channels, but these parameters can be adjusted to produce the desired amount of turbulence in the flowfield. The function of bluffbody 40 is to further enhance the mixing and entrainment of combustion constituents A and B and to push the shear layer of CRZ 64 radially outward as the swirling mixture enters combustion chamber 63, so that it can merge with the shear layer of ORZ 66 much closer to dump-step 48. CRZ 64 is a large-scale vortex which is anchored by the downstream end of bluffbody 40, and is the primary recirculation zone. The size and strength of the vortex of CRZ 64 determines and controls flame parameters including stability, combustion intensity, and residence time distributions. CRZ 64 is disposed inwardly of toroidally shaped ORZ 66 which is the second recirculation zone that is created by flow stream separation as the swirling combustion constituents pass over dump-step 48. Both recirculation zones CRZ 64 and ORZ 66 are encased by very high-turbulence swirling shear layer 68. The main combustion then takes place within shear layer 68, while CRZ 64 and ORZ 66 stoke the main flames, keeping them self-sustained and stable, and promote robust combustion and lateral flame propagation. Specifically, both CRZ 64 and ORZ 66, are dominated by low-velocity recirculating flows, provide flame stabilization to the entire combustion process by supplying a heat source of combustion products to initiate and maintain the main combustion process. Each recirculation zone takes the heat from the flame of shear layer 68, augments it and carries it upstream and when the heat comes in contact with a fresh combustible mixture, it ignites and is sustained in shear layer 68.

Dump-step 48 is positioned at the interface of swirl inlet duct wall 44 and combustor wall 46. Dump-step 48 is shaped as a ninety-degree step that helps produce and stabilize ORZ 66. In other embodiments, dump-step 48 has an angle less than ninety-degrees; e.g., quarl shaped. Ramp 52 is placed at the exit of swirl inlet duct wall 44, directly before dump-step 48 at the inlet of combustor wall 46. Dump-step 48 produces and stabilizes ORZ 66, while ramp 52 compresses combustion constituents A and B, intensifies the shear layers of ORZ 66 and CRZ 64, and increases the amount of mass entrainment into them. As the mixed combustion constituents flow over the ninety-degree dump-step 48, the flow stream separates and a toroidal ORZ 66 is created. The length of ORZ 66 is controlled by the height of the step and the strength of the swirl. For example, a higher dump-step creates a larger and more robust ORZ 66, but a stronger swirl reduces the size and intensity of ORZ 66. To achieve maximum thruster performance requires optimization of these two parameters, but not to the exclusion of the other parameters already discussed.

Typically, to initiate the combustion process of non-hypergolic combustion constituents A and B as they enter and mix in combustor 12 requires an igniter or an ignition system. Igniter 60 is positioned within the center of bluffbody 40. However, when bluffbody injector 58 is used, igniters 70 are placed along the dump-step region of combustor wall 46. Additionally, dump-step igniters may be used in addition to igniter 60, as is dictated by design variances in the combustor 12. The principal combustion is performed in shear layer 68 of the combustion chamber 12. Combined shear layer 68 straddle the boundaries between the recirculation zones and mixing zones. High shear stresses of shear layer 68 are manifestations of high turbulence intensity and a multitude of small-scale vortices, controlled by a combination of swirl intensity and flow velocity levels. Thus, complete combustion of constituents A and B is achieved within small combustor lengths L.

There is a current demand for ultra-compact rocket thrusters to provide high propulsion performance to spacecraft, such as space satellites or space vehicles, requiring small thrust forces. Typically, many compact rocket thrusters require combustor inlet diameters (D1) of less than 2.0 inches (~5.08 cm). The economics of machining and fabricating swirl vanes used in previous rocket thrusters for this small size have prevented the advantages of swirl technology from being applied to ultra-compact rocket thrusters. The helicoid flow channels 15A, 15B, 15C, and 15D of the present invention allow swirler diameters of about 0.5 inches (~1.27 cm) to about 2.0 inches (~5.08 cm) to be economically machined and fabricated. The helicoid flow channels 15A, 15B, 15C, and 15D remedy the machining and fabrication issue by cutting the helicoid flow channels 15A, 15B, 15C, and 15D at an angle into the swirl generator 14. Another benefit to using the helicoid flow channels 15A, 15B, 15C, and 15D is they reduce the number of machined parts of the ultra-compact rocket thruster and their integration, because individual swirl vanes are not necessary. The helicoid flow channels are formed into swirler 38 such that they are spirally wound around centerline (CL) of swirl generator 14. Although, swirl generator 14 is depicted as including six helicoid flow channels, fewer or greater numbers of flow channels may be used.

Additionally, helicoid flow channels 15A, 15B, 15C, and 15D further reduce the overall size, weight, and complexity of aerovortical swirl-dump combustor 12. Swirl generator 14 allows the swirl augmented combustion process to attain the combined, combustor plus convergent nozzle, length L to diameter D2 ratio ("L/D2") of approximately 1.0 to approximately 1.6. This is a significant improvement over the L/D2 ratio of 2.0-4.0 typically achieved by small conventional rocket engine thrusters. The present invention obtains the reduced L/D2 ratio by using the helicoid flow channels to impart swirl into the flow stream to create a vortex flow downstream of a swirler. Reducing the L/D2 ratio of the combustor has the added benefit of further reducing the overall thruster length and its weight. Thus, the present invention, as described with respect to FIGS. 1 through 3, shows the many advantages of utilizing a high-performance swirl augmented combustor for use in propulsion systems of ultra-compact rocket thrusters using non-hypergolic propellants. The benefits of the present invention are also beneficially applied to ultra-compact rocket thrusters employing hypergolic propellants.

Figure 4A:
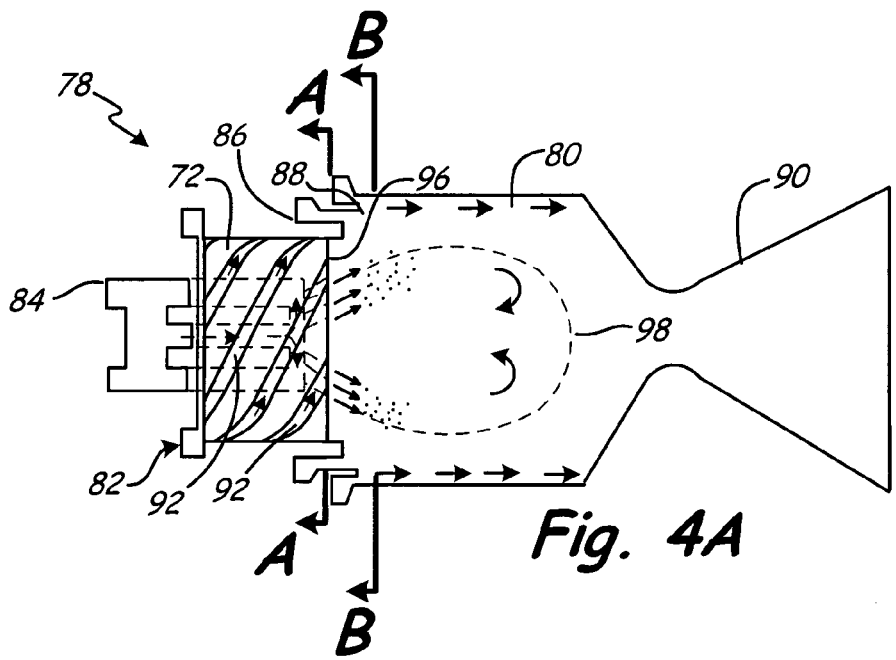
FIG. 4A shows another embodiment of an aerovortical swirl-enhanced combustor having an ultra-compact, aerovortical swirl generator without a bluffbody for use with hypergolic propellants.
Figure 5A:
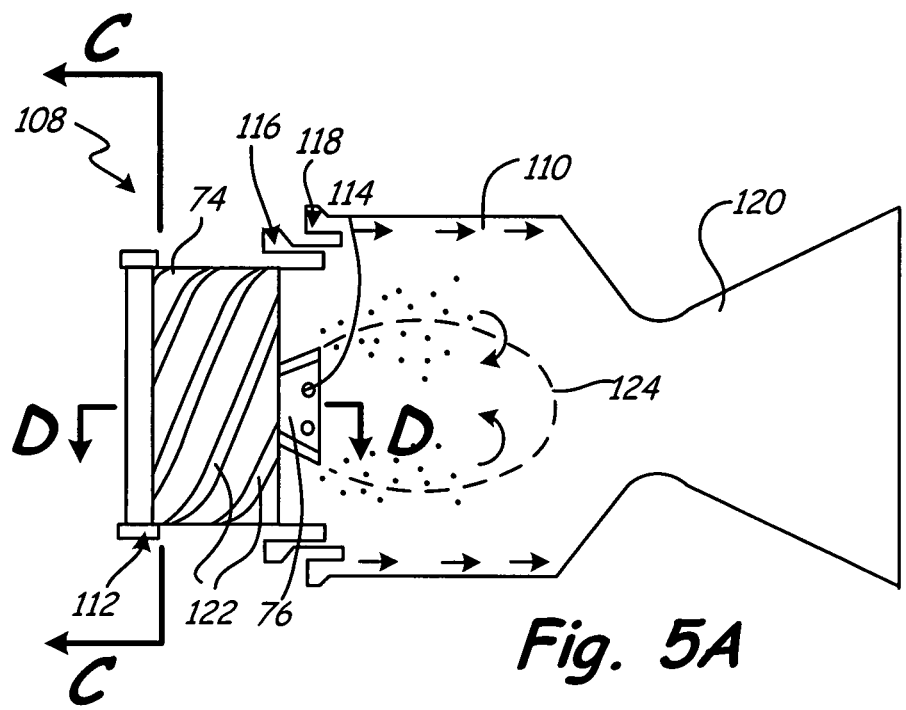
FIG. 5A shows another embodiment of the aerovortical swirl-enhanced combustor of FIG. 1 having an ultra-compact, aerovortical swirl generator with a bluffbody for use with hypergolic propellants.

FIGS. 4A and 5A show embodiments of an aerovortical swirl combustion system designed specifically for use with hypergolic bipropellants in ultra-compact rocket thrusters of the present invention. Deficiencies of the current hypergolic rocket thrusters that require specific improvements are inefficient atomization, mixing, vaporization and combustion processes. The resulting propulsion performance parameter C* (characteristic velocity) falls noticeably short of its theoretical value in a combustor whose L/D2 is too long, and its nozzle expansion section is too short, and thus the accompanying thrust and specific impulse levels are not as high as they could be. In addition, even though combustion occurs instantaneously upon injection of the hypergolic bipropellants the flamefront however is not anchored, thereby potentially creating a combustion instability that has to be mitigated by embedding an acoustic cavity into the combustor. FIGS. 4A and 5A show different embodiments of the present invention for use with hypergolic bipropellants such that efficient atomization, mixing, vaporization, combustion and high propulsive performance in short L/D2 combustors is obtained using swirl technology of the present invention. FIG. 4A shows aerovortical swirl generator 72 without a bluffbody. FIG. 5A shows aerovortical swirl generator 74 having bluffbody 76. Swirl generator 72 and swirl generator 74 include fuel boundary layer control systems for preventing contact between the oxidizer and the combustor wall.

Typical hypergolic bipropellant combustion constituents used in satellite and spacecraft propulsion systems comprise nitrogen tetroxide as the oxidizer, and hydrazine or monomethyl hydrazine as the fuel. The hypergolic rocket propellants, also referred to as organometallic, are used because they contain high energy capacity per unit volume, which allows for reduction in storage tank size and weight for short missions, or for stowage of more propellants for longer missions. These propellants are extremely volatile, unstable and toxic, thereby requiring special handling and care in designing equipment used with them. But, because of their volatility, hypergolic bipropellants ignite spontaneously when injected into a combustor and upon contact with each other. Therefore, the need for ignition system is eliminated. Additionally, a dump-step, staged oxidizer injection and other fuel mixing devices are also not necessary. However, because of the volatility and instability, the oxidizer must be kept away from direct contact with combustor surfaces upon injection.

Figure 4B:
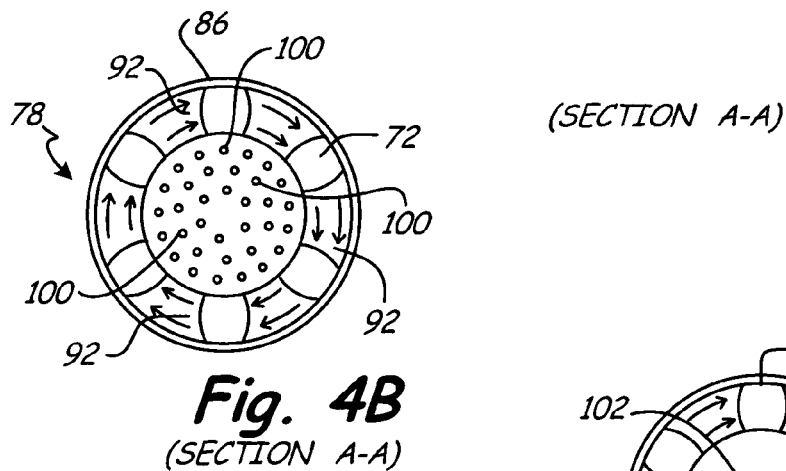
FIG. 4B shows cross-section A-A taken through the aerovortical swirl-enhanced combustor of FIG. 4A in which the swirl generator includes multiple small-diameter orifice injectors.
Figure 4C:
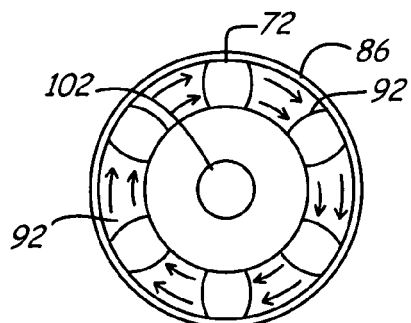
FIG. 4C shows cross-section A-A taken through the aerovortical swirl-enhanced combustor of FIG. 4A in which the swirl generator includes a single large-diameter orifice injector with fuel boundary layer control along the combustor wall.

FIG. 4A depicts a cross-section of aerovortical swirl generator 72 for use in hypergolic ultra-compact aerovortical thruster 78 (HyperCAT). The HyperCAT 78 includes swirl generator 72, swirl combustor wall 80, fuel injection manifold 82, oxidizer injection manifold 84, acoustic cavity 86, fuel injection boundary layer control (BLC) manifold 88, convergent-divergent thrust producing nozzle 90 and helical flow channels 92. Within HyperCAT 78, a primary combustion constituent, such as a fuel, is reacted with a secondary combustion constituent, such as an oxidizer, to produce gaseous high pressure products of combustion for expanding through exhaust nozzle 90 to product thrust. Fuel is injected into combustor wall 80 from injection manifold 82, which comprises a ring of injectors around the inlet of combustor wall 80, and pushed through helicoids flow channels 94. Helical flow channels 94 impart swirl into the flowing stream of fuel downstream of exit plane 96. An oxidizer propellant is supplied by manifold 84 and injected into CRZ vortex 98 and shear layer 68 as small droplets. The swirling fuel flowfield produces a large-scale CRZ vortex 98 that extends into combustor 80 and is highly turbulent and three-dimensional. FIG. 4B, which is taken at section A-A of FIG. 4A, shows a first embodiment of exit plane 96 in which the oxidizer propellant supplied by manifold 84 is injected through a plurality of orifices 100 at exit plane 96 of swirl generator 72 into the high-shear laden swirling fuel flow aerodynamic structure of combustor 80. FIG. 4C, which is also taken at section A-A of FIG. 4A, shows a second embodiment of exit plane 96 in which oxidizer is injected through spray nozzle 102, which comprises a single, large-diameter spray injector. In either embodiment, small droplets of the oxidizer are introduced into the high intensity turbulent shear layer of CRZ vortex 98, wherein the oxidizer atomizes, mixes with the fuel, spontaneously ignites on contact, vaporizes and burns to produce thrust as it expands through nozzle 90.

Figure 4D:
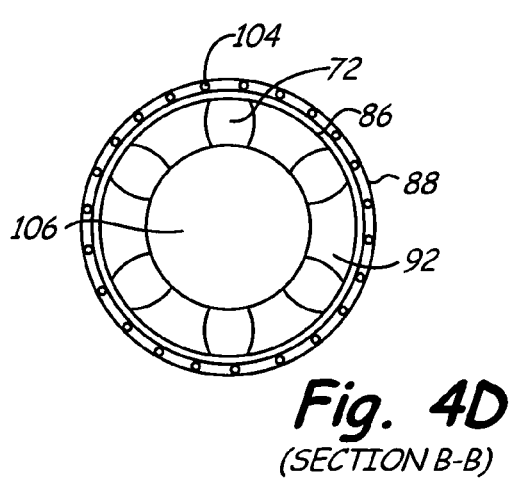
FIG. 4D shows cross-section B-B taken through the aerovortical swirl-enhanced combustor of FIG. 4A in which the swirl generator includes an acoustic cavity and fuel boundary layer control.

The oxidizer droplets are shattered and slowed down by the drag of the turbulent shear stresses present in the shear layer of CRZ vortex 98. The oxidizer immediately ignites upon contact with the fuel, thus eliminating the need for an ignition system. Also, in this embodiment, HyperCAT 78 does not require a dump-step or ramp at the inlet of combustor wall 80. The fine liquid spray of the hypergolic oxidizer is effectively vaporized and consumed by the swirling hypergolic fuel within the thick shear layer so that it does not come into contact with combustor wall 80, thereby avoiding burn-through problems. However, if some of the liquid oxidizer spray-droplets do manage to penetrate through the CRZ vortex 98 and reach combustor 80, a secondary means for preventing contact of the oxidizer with combustor wall 80 is provided using fuel injection boundary layer control (BLC). As can be seen in FIG. 4D, which is taken at section B-B of FIG. 4A, BLC manifold 88 can be used to encapsulate the combustion process in a fuel pocket. BLC manifold 88 injects a fuel stream through multiple orifices 104 positioned circumferentially around back face 96 of swirl generator 72 and combustor wall 80 to establish a barrier to the oxidizer and prevent a potential burn-through.

Combustor wall 80 of FIG. 4A encapsulates the combustion process which is stabilized and continuously stoked by the aerodynamically embedded CRZ vortex 98. Acoustical cavity 86 provides a void or air gap between the combustion process and wall 80 for damping combustion oscillations. Acoustical cavity 86 is shown as having an axially recessed configuration; however, in other embodiments a radially recessed configuration can be used. Due to the swirl enhancement of helicoid flow channels 92, the mixing and combustion of the injected hypergolic bipropellants are robust and burning is completed in much shorter distance, L/D2 less than 1.6, than currently possible in traditional space vehicle thrusters. Therefore, the combustion efficiency is higher, the length of swirl combustor wall 80 is shorter and more compact, the C* is increased, and more length, is therefore available for extending the expansion of nozzle 90 to provide higher propulsive specific impulse $I_{sp}$ and thrust. To further enhance the mixing and combustion processes of the HyperCAT, swirl generator 72 can be provided with a bluffbody extending from end 106 of swirl generator 72 to exit plane 96, as seen in FIG. 5A.

Figure 5B:
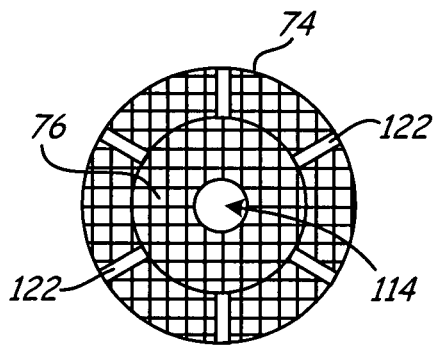
FIG. 5B shows a front view of the swirl generator of FIG. 5A.
Figure 5C:
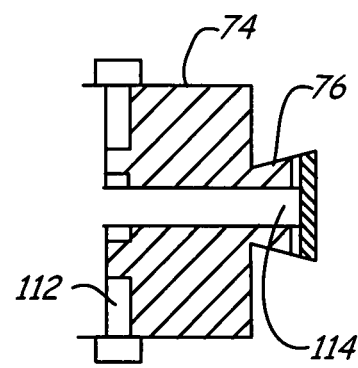
FIG. 5C shows a cross-sectional view of the swirl generator of FIG. 5A.

FIG. 5A shows cross-section of aerovortical swirl generator 74 for use in HyperCAT 108, which comprises another embodiment of the present invention. FIG. 5B shows a cross section taken at section C-C of FIG. 5A showing the front face of swirl generator 74. FIG. 5C shows a cross-section of swirl generator 74 taken along the section D-D of FIG. 5A, depicting how the fuel and oxidizer are distributed to the helicoid channels 122 and bluffbody orifices 114. HyperCAT 108 includes swirl generator 74, combustor wall 110, fuel injection manifold 112, oxidizer injection manifold 114, acoustical cavity 116, fuel injection boundary layer control (BLC) manifold 118, and convergent-divergent nozzle 120. Swirl generator 74 includes bluffbody 76 and helicoids flow channels 122. HyperCAT 108 and swirl generator 74 burn hypergolic bipropellants such as is done with combustor 78. Swirl generator 74, however, includes bluffbody 76 to produce an even more efficient propulsive performance from combustor 108 in ultra-compact rocket thrusters for powering satellites and other spacecraft. HyperCAT 108 operates in much the same way as HyperCAT 78 with the salient difference between the configurations of FIG. 4A and FIG. 5A being the implementation of short conical bluffbody 76. Bluffbody 76 renders more flexibility in controlling the location and function of CRZ vortex 124. Bluffbody 76 also allows for more flexibility in positioning oxidizer injection, which controls penetration, atomization, mixing and combustion processes. This flexibility further enhances the ability to control the temperature of combustor wall 110, which, as described above, is required for hypergolic combustion.

As in embodiment described with respect to FIG. 4A, fuel supplied from manifold 112 to aerovortical swirl generator 74 passes through a plurality of helicoid channels 122 and upon exiting, strong tangential and radial velocities are imparted upon its swirling flow stream structure to produce CRZ vortex 124. The fluid mechanics of this flow stream features a very robust CRZ vortex 124 and a rapidly spreading high-turbulence intensity shear layer, directly into which the oxidizer is injected from manifold 114 within bluffbody 76. As with swirl generator 72 of FIG. 4A, a single, large-diameter spray injector in the base of the bluffbody 76 can be used, or a plurality of small-diameter orifice injectors can be used. Some of the oxidizer is entrained into CRZ vortex 124 where it reacts with the fuel, and the hot products of combustion recirculate and re-enter the turbulence laden high shear stress layer to stoke and self-sustain a stable and instability-free main combustion. This aerovortical swirl combustor design approach leads to a simple and very efficient combustion system that reduces complexity, risk and cost, yet at the same time yields higher propulsion performance than the historical hypergolic rocket thrusters.

Thus, the present invention achieves an ultra-compact aerovortical swirl combustion (ASC) system for use with rocket thrusters in various spacecraft. The ASC system can be used with hypergolic and non-hypergolic propellants. The ASC system includes a swirl generator that results in improvements in propulsion performance over historical thruster designs. The swirl generator includes a plurality of helicoid flow channels for producing a turbulent, swirling flowfield into a stream of a propellant to improve mixing and combustion processes with a second propellant. In one embodiment, the aerovortical swirl generator includes a swirler, a bluffbody, a fuel manifold and an oxidizer manifold for use with hypergolic propellants. In such an embodiment, the ASC system may also include an acoustical cavity or a fuel boundary layer control for producing a temperature-reducing layer of fuel along the combustor wall 80 and thus preventing oxidizer from reaching and reacting with the combustor wall. In another embodiment, the aerovortical swirl generator includes a swirler, a centerbody, a bluffbody, an ignition source, a dump-step and ramp, and a plurality of injectors for use with non-hypergolic propellants. In any embodiment, the aerovortical swirl generator broadens the scope of potential rocket engine thruster applications by reducing the length and weight of the thruster propulsion system with thrust levels ranging from less than 5 $lb_f$ to about 250 $lb_f$, and combustors having L/D2 ratios between approximately 1.0 and approximately 1.6.

Although the present invention has been described with reference to preferred embodiments, workers skilled in the art will recognize that changes may be made in form and detail without departing from the spirit and scope of the invention.

The invention claimed is:

1. An aerovortical swirl-enhanced combustion system for use in a rocket propulsion thruster system, the combustion system comprising:
   an annular combustor having an inlet and an exit;
   a first injector for injecting a first combustion constituent into the inlet of the annular combustor;
   an aerovortical swirl generator positioned at the inlet of the annular combustor, the aerovortical swirl generator comprising a swirler having a plurality of helicoid flow channels for introducing a highly turbulent, three-dimensional swirling flowfield into the first combustion constituent;
   a second injector for injecting a second combustion constituent into the swirling flowfield of the first combustion constituent such that a burning combustion process can take place in the swirling flowfield, the first and second combustion constituents selected from the group consisting of a fuel and an oxidizer;
   a dump-step located at the inlet of the annular combustor such that an initial portion of the swirling flowfield of the first combustion constituent flows over the dump-step to create a toroidal outer recirculation zone alone the combustor wall;
   an inlet ramp adjacent to the dump step to increase a height of the dump-step to increase the height, length and volume of the toroidal outer recirculation zone; and
   an exhaust nozzle connected to the exit of the combustor wall for receiving byproducts of the combustion process to produce thrust.

2. The aerovortical swirl-enhanced combustion system of claim 1 wherein the swirler has a diameter in the range from about 0.5 inch to about 2.0 inch.

3. The aerovortical swirl-enhanced combustion system of claim 1 wherein the helicoid flow channels are formed at an angle into the swirler so that the flow stream creates a vortex flow downstream of the swirler.

4. The aerovortical swirl-enhanced combustion system of claim 1 wherein the helicoid flow channels are spirally wound around a center axis of the swirler.

5. The aerovortical swirl-enhanced combustion system of claim 1 wherein the nozzle comprises a convergent-divergent nozzle.

6. The aerovortical swirl-enhanced combustion system of claim 1 wherein the rocket propulsion thruster system produces about 5 $lb_f$ to about 250 $lb_f$ of thrust.

7. The aerovortical swirl-enhanced combustion system of claim 1 wherein the ratio of the combined combustor and exhaust nozzle length to the combustor diameter ranges from approximately 1.0 to approximately 1.6.

8. The aerovortical swirl-enhanced combustion system of claim 1 and further comprising a bluffbody attached to a downstream face of the swirler, the bluffbody including a flared conical portion for promoting mixing of the first and second combustion constituents, as well as for anchoring and stabilizing the burning combustion process.

9. The aerovortical swirl-enhanced combustion system of claim 8 and further comprising a centerbody for adjusting the position of the bluffbody relative to the dump step.

10. The aerovortical swirl-enhanced combustion system of claim 9 wherein the second injector comprises a plurality of injectors located at a position selected from the group consisting of: a combustor inlet wall downstream of the swirler, within the centerbody and within the bluffbody, wherein the plurality of injectors mix a portion of the second combustion constituent with a portion of the first combustion constituent to supply the outer recirculation zone with an ignitable mixture to self-sustain a stable combustion process.

11. An aerovortical swirl-enhanced combustion system for use in a rocket propulsion thruster system, the combustion system comprising:
   an annular combustor having an inlet and an exit;

an aerovortical swirl generator positioned at the inlet of the annular combustor, the aerovortical swirl generator comprising a swirler having a plurality of helicoid flow channels for introducing a highly turbulent, three-dimensional swirling flowfield into the first combustion constituent;

a first injection manifold positioned around an upstream face of the swirler for injecting a first combustion constituent into the aerovortical swirl generator and the inlet of the annular combustor;

a second injector for injecting a second combustion constituent into the swirling flowfield of the first combustion constituent such that a burning combustion process can take place in the swirling flowfield, the first combustion constituent and the second combustion constituent comprise hypergolic bipropellants; and an exhaust nozzle connected to the exit of the combustor wall for receiving byproducts of the combustion process to produce thrust.

12. Aerovortical swirl-enhanced combustion system of claim 11, wherein the second injector comprises a second injection manifold comprising a plurality of injectors positioned in the swirler for injecting the second combustion constituent into the flowfield of the first combustion constituent to initiate a hypergolic combustion process.

13. An aerovortical swirl-enhanced combustion system for use in a rocket propulsion thruster system, the combustion system comprising:

an annular combustor having an inlet and an exit;

a first injector for injecting a first combustion constituent into the inlet of the annular combustor;

an aerovortical swirl generator positioned at the inlet of the annular combustor, the aerovortical swirl generator comprising a swirler having a plurality of helicoid flow channels for introducing a highly turbulent, three-dimensional swirling flowfield into the first combustion constituent;

a second injector for injecting a second combustion constituent into the swirling flowfield of the first combustion constituent such that a burning combustion process can take place in the swirling flowfield, the first combustion constituent and the second combustion constituent comprise hypergolic bipropellants;

an acoustical cavity for damping oscillations in the combustion process of the hypergolic bipropellants; and an exhaust nozzle connected to the exit of the combustor wall for receiving byproducts of the combustion process to produce thrust.

14. An aerovortical swirl-enhanced combustion system for use in a rocket propulsion thruster system, the combustion system comprising:

an annular combustor having an inlet and an exit;

a first injector for injecting a first combustion constituent into the inlet of the annular combustor;

an aerovortical swirl generator positioned at the inlet of the annular combustor, the aerovortical swirl generator comprising a swirler having a plurality of helicoid flow channels for introducing a highly turbulent, three-dimensional swirling flowfield into the first combustion constituent;

a second injector for injecting a second combustion constituent into the swirling flowfield of the first combustion constituent such that a burning combustion process can take place in the swirling flowfield, the first combustion constituent and the second combustion constituent comprise hypergolic bipropellants;

a boundary layer control manifold for producing a boundary layer of the first combustion constituent between the burning swirling flowfield and the combustor wall; and an exhaust nozzle connected to the exit of the combustor wall for receiving byproducts of the combustion process to produce thrust.

* * * * *